United States Patent Office.

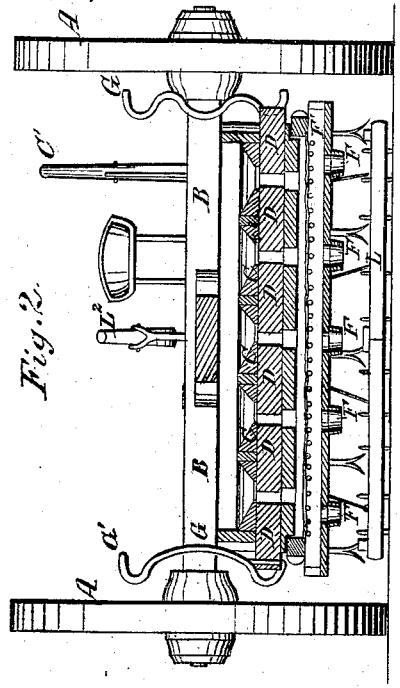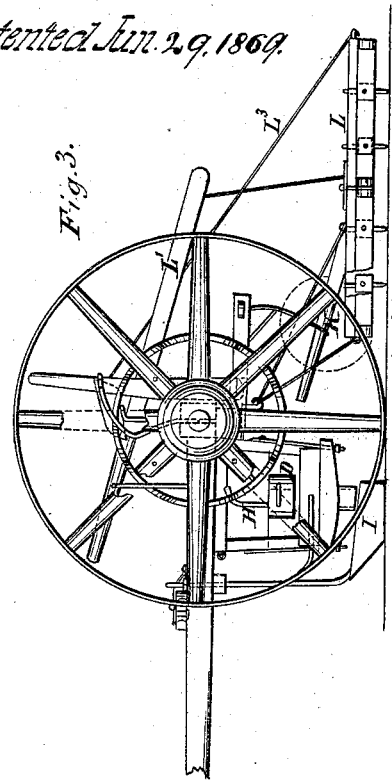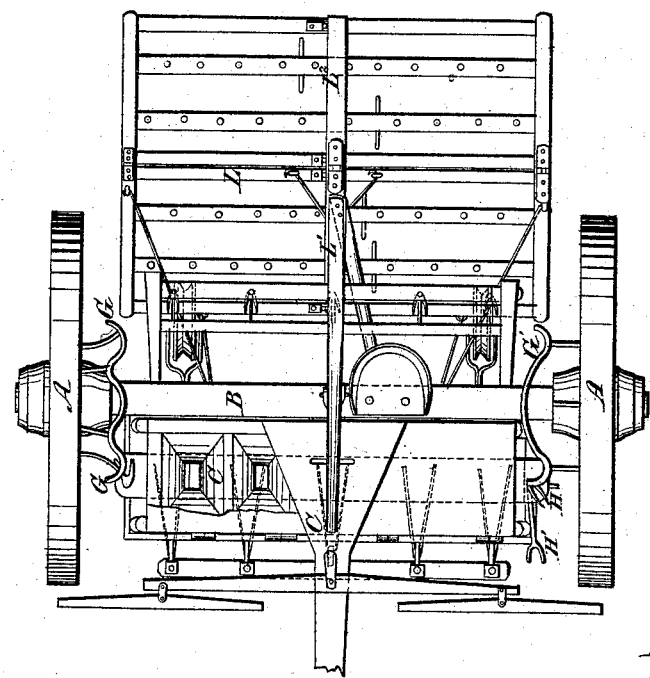

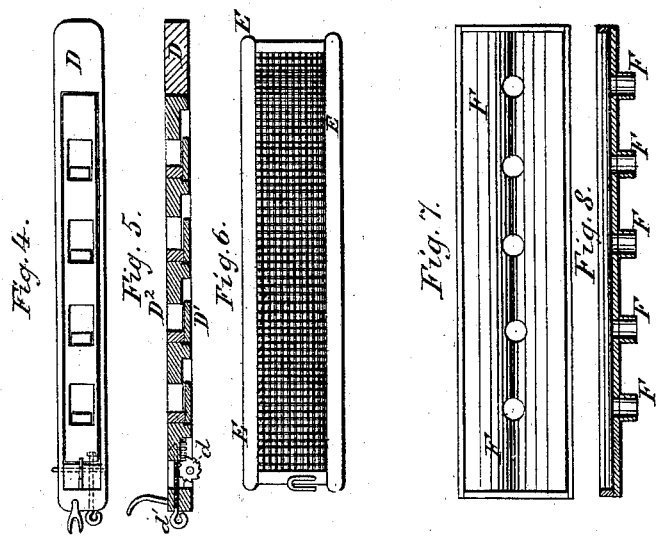

DAVID EVANS, OF NEWTON IOWA.

*Letters Patent No. 91,925, dated June 29, 1869.*

IMPROVEMENT IN COMBINED GRAIN-DRILL, SEED-SOWER, AND CORN-PLANTER.

The Schedule referred to in these Letters Patent and making part of the same.

*To all whom it may concern:*

Be it known that I, DAVID EVANS, of Newton, in the county of Jasper, and State of Iowa, have invented a new and useful Combined Grain-Drill, Seed-Sower, and Corn-Planter; and I do hereby declare that the following is a full, clear, and exact description of the same, reference being had to the annexed drawings, making part of this specification, in which—

Figure 1 is a plan view.
Figure 2 is a transverse section.
Figure 3 is a side elevation.
Figure 4 is a plan view of the feed-bar.
Figure 5 is a section.
Figure 6 is a plan of the screen used in sowing broadcast.
Figure 7 is a plan of the box to which the tubes are attached.
Figure 8 is a section of the same.

The same letters in all the figures relate to identical parts.

My improvements relate to the combination and arrangement of parts adapted to drilling, or sowing grain and planting corn, and their nature and character will be hereinafter set forth.

In the annexed drawings—

A A are the wheels, and
B, the axle.

C is the hopper, which is attached below the hounds, by a bolt, c, on which it may be made to oscillate by means of the lever C', so as to throw the operating-mechanism into or out of gear.

The hopper may be used in one continuous chamber, or it may be subdivided into compartments, by the insertion of transverse-sliding partitions, when it is to be used in planting corn.

The grains pass through openings in the bottom of the hopper, into chambers formed in the sliding feed-bar D, which is constructed in two parts, as clearly shown in figs. 4 and 5, the lower part, D', being made so, that by sliding it, the apertures, or chambers may be enlarged or diminished, according to the character of the work intended to be performed. It may be regulated by means of a rack and pinion, $d$, or by means of a set-screw, $d'$, as may be preferred.

The screen E is swung below the feed-bar, upon hangers, which permit its oscillation.

Below the screen is a concave trough, $F^1$, which, catching the grain, delivers it through the tubes in furrows formed by the shoes T, attached by rods to the frame, and so set, by adjustable nuts, as to permit them to be regulated as to their depth, and to allow the removal of those not needed, when the machine is changed from a drill to a corn-planter.

The grain is covered by the grooved wheel K, running behind the tubes. This wheel is used only for covering corn.

The cams G and G', attached to the wheels, and revolving with them, are rods, or plates formed to act upon rods attached to the ends of the feed-bar D and screen E, and give them a longitudinally-reciprocating motion.

The cam G gives a rapid motion, for drilling; the cam G' gives a slower motion, for planting corn.

A lever may also be attached to the feed-bar, so that, disengaging the cams, the feed-bar may be moved by hand periodically, as required in planting corn.

A double revolving harrow, L, is attached, by rods, so that it may be removed, or attached so as to follow after the tubes and cover the grain. This harrow is suspended upon a lever, $L^1$, so that it may be raised or lowered as desired. One half may be folded up by raising it on hinges, by means of the cord $L^3$.

The bar $L^2$ is hinged to the top of the harrow, upon its edges, having pins projecting from its opposite edge, by means of which the harrow may be prevented from revolving; or by swinging it by means of a lever, so as to raise the pins out of the reach of the teeth, the harrow may be permitted to revolve.

Another office of this bar is to prevent the rear portion of the harrow from being folded up, when the bar is turned upon its side, and thus to insure the effective working of the whole surface of the harrow, by preventing the rear portion from gliding over the surface of the ground without its teeth entering therein to the proper depth.

This machine is intended for sowing, drilling, or planting, and when applied to one or the other purpose, the machine is properly adjusted by changing the parts.

Thus, when used for drilling, the parts G', L, $L^1$, and $L^2$, are detached, the machine then consisting of the parts D, E, C, (arranged as described, in one chamber,) G, I.

When used for sowing grain, the parts E, G, L, $L^1$, and $L^2$, are used, the parts G' and I being detached.

In planting corn, the parts G' and K are used, the parts E, I, and L, $L^1$, and $L^2$, being detached.

The feed-bar D is to be used for all the purposes of drilling, sowing, and planting, and the hopper C altered as mentioned, so as to be subdivided when used in planting corn.

Instead of the harrow, I also propose to use shovel-plows, attached so as to be raised in the same manner as the harrow, to be used to cover the grain when sowed.

What I claim as my invention, and desire to secure by Letters Patent, is—

1. The combination of the hopper C and lever C', with the cams and the rods deriving motion therefrom, when so arranged that the rods may be thrown out of gear by the action of the lever, substantially as set forth.

2. The combination of the feed-bar D, sieve E, and trough F', and tubes F, substantially as set forth.

3. The combination of the cutters I, tubes F, and revolving harrow L, substantially as set forth.

4. The combination of the double revolving harrow and the bar $L^2$, substantially as and for the purpose set forth.

5. The combination of the parts L, $L^1$, $L^2$, and $L^3$, arranged to operate substantially as set forth.

In testimony whereof, I have signed my name to this specification, in the presence of two subscribing witnesses.

DAVID EVANS.

Witnesses:
W. EDWARD,
G. W. C. JOHNSTON.